No. 880,021. PATENTED FEB. 25, 1908.
G. H. GROSS.
TROLLEY.
APPLICATION FILED APR. 26, 1906.
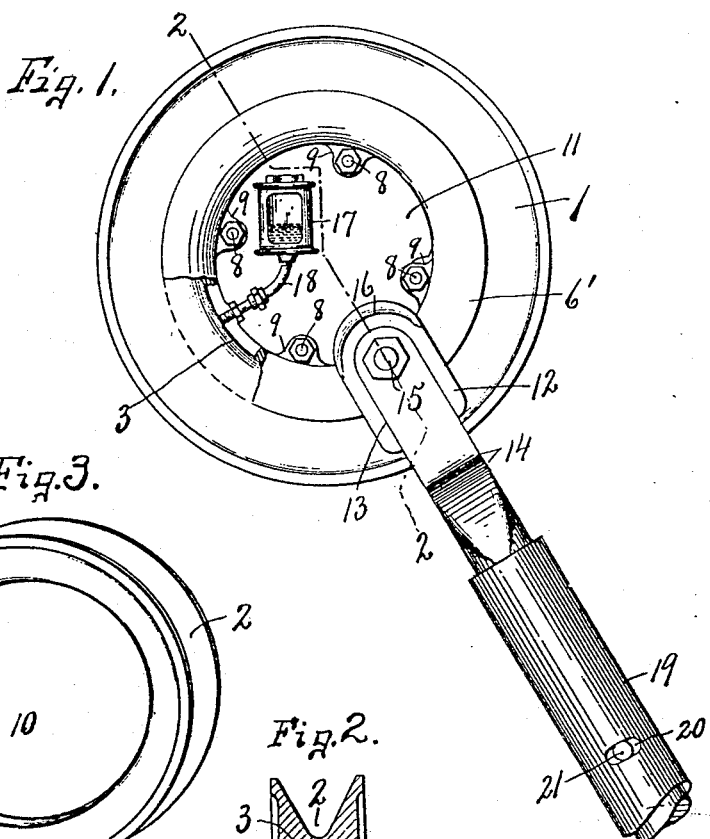
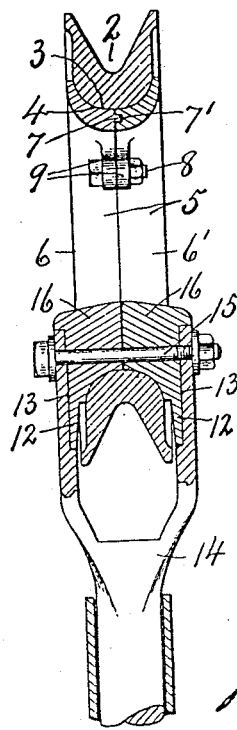
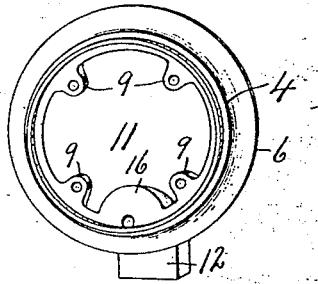
Witnesses:
H. E. Arthur
H. E. Chase
Inventor.
George H. Gross
By
Howard P. Denison
Attorney.

UNITED STATES PATENT OFFICE.

GEORGE H. GROSS, OF BINGHAMTON, NEW YORK.

TROLLEY.

No. 880,021.　　　　Specification of Letters Patent.　　　　Patented Feb. 25, 1908.

Application filed April 26, 1906. Serial No. 313,812.

*To all whom it may concern:*

Be it known that I, GEORGE H. GROSS, of Binghamton, in the county of Broome, in the State of New York, have invented new and useful Improvements in Trolleys, of which the following, taken in connection with the accompanying drawings, is a full, clear, and exact description.

This invention relates to improvements in trolleys comprising an open grooved ring adapted for rolling contact with an electric conductor and mounted in a non-rotatable annulus or open annular frame secured to the trolley-pole or harp. These trolleys are usually provided with a central hub journaled in or upon a central bearing of comparatively small cross sectional area which soon becomes worn to such an extent as to render it unfit for further use aside from the fact that the transmission of electric current from the trolley to the pole is more or less imperfect causing excessive arcing at the running joint, which results in a considerable loss of power.

The essential object of my invention is to establish a broader area of contact between the trolley and its supporting frame on which it is journaled for the purpose of securing a more perfect and permanent running fit, and consequently a more perfect electric contact at the running joint. In other words, I have sought to increase the life and working efficiency of the trolley-wheel, and at the same time, reduce the cost of manufacture and repairs of this part of the equipment.

A further object is to enable a lubricator or oil-cup to be incorporated wholly within the open trolley supporting annulus, and consequently within the trolley so as to feed the lubricant centrally to the trolley bearing.

A still further object is to simplify and lighten the structure of the trolley and its supporting bearings without sacrificing its strength and durability.

Other objects and uses will be brought out in the following description.

In the drawings—Figure 1 is a side elevation of my improved trolley and its supporting bearings, one side of which is partly broken away. Fig. 2 is a sectional view taken on line 2—2, Fig. 1. Figs. 3 and 4 are isometric views respectively of the trolley and one of the annular bearing sections.

In carrying out the objects stated, I provide an open annulus or ring —1— with an outer annular groove —2— and an inner annular bearing face —3—, which is convexed or rounding in cross section. The inner transversely curved bearing face —3— of the trolley-ring —1— is seated in an annular groove —4— in the periphery of an open annular frame —5— which is divided through its transverse center at substantially right angles to its axis forming opposite annular supporting sections —6— and —6'—. The meeting faces of these sections —6— and 6'— are formed respectively with an annular tongue —7— and a groove 7'— intermeshing with each other to prevent relative radial movement one upon the other, said sections being clamped together by suitable fastening means, as bolts —8—, which are passed through inwardly projecting lugs —9—. The sections —6— and 6'— are inserted in the central opening, as —10—, from the opposite sides of the ring —1— so as to meet at substantially the transverse center of said ring, each section forming substantially half of the annular groove —4—.

The annular frame —5— has a central opening —11— therethrough from side to side and is formed with radial arms 12— extending outwardly at opposite sides of the trolley-ring —1—, each arm being provided with a recess or groove 13— for receiving one of the arms of a bifurcated harp or head 14—, said arms being secured to the annular frame —5— by a clamping bolt 15— which is passed through lugs 16— on the section —6— and 6'— between the inner bearing —4— and center of the annular frame —5—, leaving a clear open space entirely through the frame from side to side, in which is located an oil-cup 17— having a conduit 18— leading therefrom and terminating in the periphery of the frame —5— so as to conduct the oil from the cup 17— to the running joint between the trolley-ring —1— and its supporting frame —5—.

In assembling the parts of my invention, the frame sections —6— and 6'— are inserted from opposite sides into the opening —10— with their peripheral bearings in engagement with the inner face of the trolley-ring —1—, after which they are clamped together by the bolts —8— and the harp or head 14— is then placed in operative position in the recesses 13— and clamped to the lugs —16— by the bolt 15—. The stem of the harp is then inserted through a tubular pole 19— having a transversely elongated slot —20— for receiving a pin —21— on the stem of the harp, thereby locking the harp and pole against endwise movement, and at the same time the slot —20— permits a light lateral rocking movement of the harp and trolley which is mounted thereon.

It will be seen from the foregoing description that the trolley ring —1— and its annular supporting frame —5— are comparatively light and that the bearing of the trolley ring is co-extensive with the periphery of its supporting ring —5—, the sides of which form annular flanges to retain the trolley ring against lateral displacement. It will also be seen that by leaving the entire center of the annular frame —5— open from side to side, I am enabled to place the oil-cup —17— entirely within and between the planes of the sides of the frame —5— and trolley ring —1— and that by making the trolley in the form of a ring, it may be manufactured at a minimum cost, and replaced with comparatively little expense when worn beyond repair. This trolley-ring is usually made of bronze or equivalent metal, while the annular frame in which it has running fit is preferably made of a different metal, as cast or malleable iron or steel, which in practice I find to produce less abrasion or cutting of the wearing surfaces when traveling one upon the other.

What I claim:

1. In a device of the character described, a non-rotatable ring having a clear open space therethrough from side to side, an oil cup within the ring and having a conduit attached thereto and to the ring and extending through its periphery, and a trolley-ring rotatable on the periphery of the first named ring.

2. In a device of the character described, a pole, a harp journaled on the pole and having a limited rocking movement, means for limiting such movement, a non-rotatable ring composed of annular sections, one of said sections being attached to the harp, and a trolley journaled on said ring.

In witness whereof I have hereunto set my hand this 19th day of April 1906.

GEORGE H. GROSS.

Witnesses:
A. K. MAREAN,
WM. M. McLEAN.